United States Patent
Mohri

[15] 3,673,926
[45] July 4, 1972

[54] FLUID OPERATED POSITION SELECTING DEVICE

[72] Inventor: Yohichi Mohri, Yokohama, Japan
[73] Assignee: Nissan Motor Company, Limited, Kanagawa-ku, Yokohama, Japan
[22] Filed: Nov. 3, 1970
[21] Appl. No.: 86,573

[30] Foreign Application Priority Data
Nov. 12, 1969 Japan..................................44/90671

[52] U.S. Cl.........................................92/51, 91/170, 92/75
[51] Int. Cl.....................................................F07b 7/20
[58] Field of Search...................92/62, 61, 51, 52, 53, 75; 91/170

[56] References Cited

UNITED STATES PATENTS

| | | | |
|---|---|---|---|
| 3,410,307 | 11/1968 | Szereszewski | 91/170 R |
| 2,667,035 | 1/1954 | Marsden | 92/52 X |
| 2,831,464 | 4/1958 | Lillquist | 92/52 X |
| 2,896,413 | 7/1959 | Hussey | 92/62 |
| 3,353,637 | 11/1967 | Chana | 92/52 X |

FOREIGN PATENTS OR APPLICATIONS 809,814  11/1959  France........................................92/52

Primary Examiner—Martin P. Schwadron
Assistant Examiner—Leslie J. Payne
Attorney—John Lezdey

[57] ABSTRACT

A device for selecting three different positions, which includes a hollow body having formed therein first and second bores selectively communicating with a source of pressurized fluid, a first piston having a flange slidably fitted in the first bore and a hollow extension extending from the flange and slidably fitted in the second bore, a second piston having a flange slidably fitted in the second bore and a hollow extension extending from the flange of the second piston and slidably fitted in the inner peripheral wall of the extension of the first piston, and a piston rod rigidly connected to the flange of the second piston. The positions of the second piston is shifted by selectively drawing a pressurized fluid into the first and/or second bores.

1 Claim, 2 Drawing Figures

FLUID OPERATED POSITION SELECTING DEVICE

This invention relates to a fluid pressure operated position selecting device, and more particularly to a device characterized by a novel construction adapted for selecting three different positions under the control of a fluid pressure.

The device herein disclosed will find a variety of practical applications where continuous shifting between three different positions is required.

Figure 1:
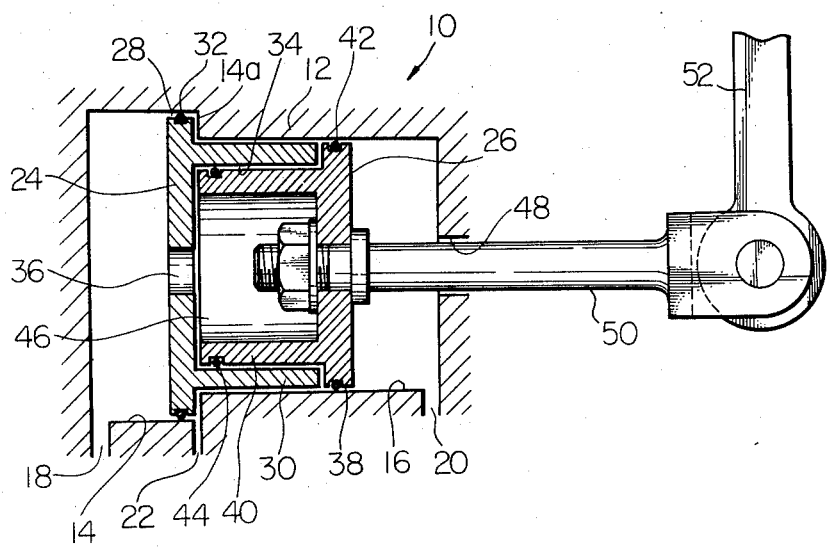
FIG. 1 is a sectional view of the device according to the invention.

Referring now to FIG. 1, the device implementing the invention, as indicated by reference numeral 10, includes a hollow body 12 of contoured internal section. The hollow body 12 has formed therein bores 14 and 16 of which the bore 14 is larger in cross section than the bore 16. The bores 14 and 16 selectively communicate with a source (not shown) of a pressurized fluid through respective ports 18 and 20.

The device 10 also includes first and second pistons 24 and 26. The first piston 24 has a flange 28 which is slidably fitted in the bore 14 and a hollow extension 30 which extends from the flange 28 and which is slidably fitted in the bore 16. A first sealing means or piston ring 32 may preferably be provided between the outer peripheral edge of the flange 28 and the inner wall of the hollow body 12 defining the bore 14. The hollow extension 30 defines therein a cavity 34. The flange 28 has formed therein an aperture 36 which provides communication between the bore 14 and the cavity 34.

The second piston 26 has a flange 38 slidably fitted in the bore 16 and a hollow extension 40 which extends from the flange 38 of the second piston 26 and which is slidably fitted in the inner peripheral wall of the hollow extension 30 of the first piston 24. A second sealing means or piston ring 42 may preferably be provided between the outer peripheral edge of the flange 38 and the inner wall of the hollow body 12 defining the bore 16. Between the extensions 30 and 40 of the piston 24 and 26, respectively, may also preferably be mounted a third piston ring 44. The hollow extension 40 defines therein a cavity 46.

To ensure smooth movement of the piston 26 relative to the piston 24, a drain port 22 may be provided communicating with the substantial clearance between the extensions 30 and 40 of the pistons 24 and 26, respectively, and opened to the atmosphere.

A piston rod 50 is rigidly connected to the flange 38 of the second piston 26. The piston rod 50 extends through the bore 16 and outwardly from the hollow body 12 through a hole 48 formed in the wall of the hollow body 12. The piston rod 50 is connected at its leading end to an operating arm 52 for carrying the relative movement of the piston rod 50 to an operated device (not shown).

When both of the bores 14 and 16 communicate with the source of a pressurized fluid through the ports 18 and 20, respectively, the fluid is drawn into the bores 14 and 16 to act on the flanges 28 and 38 of the first and second pistons 24 and 26, respectively, thereby moving the piston 24 to its innermost position and the second piston 26 to a position to be in contact with the flange 28 held in its innermost position. The movement of the piston 24 is limited by a shoulder 14a partly defining the bore 14. The piston 26 in the condition has its hollow extension 40 fully admitted into the cavity 34 of the extension 30 of the piston 24, and thus the movement of the piston 26 toward the bore 14 is limited by the piston 24 which is now seated on the shoulder 14a. The piston 26 is in this manner held stationary in its neutral or intermediate position as shown in FIG. 1. This position of the piston 26 is maintained because of the fact that the surface area of the flange 28 subjected to the fluid pressure in the bore 14 is larger than the surface area of the flange 26 subjected to the fluid pressure in the bore 16.

When the communication between the bore 14 and the source of the pressurized fluid is blocked with the bore 16 kept communicating with the source of the pressurized fluid, the fluid is drawn only into the bore 16. The fluid pressure in the bore 16 then acts on the flange 38 of the second piston 26, thereby moving the piston 26 to its innermost position.

When, in contrast, the communication between the bore 16 and the source of pressurized fluid is blocked with the bore 14 kept communicating with the source of the pressurized fluid, the fluid is drawn not only into the bore 14 but into the cavity 34 through the aperture 36. The fluid pressure passed into the cavity 34 then acts on the inner wall surface of the flange 38, thereby moving the second piston 26 to its outermost position.

Thus, the piston 26 can be moved to any of its innermost, intermediate and outermost positions by selectively blocking the fluid communications between the source of the pressurized pressure and the bores 14 and 16. Such movement of the piston 26 is transmitted to the operated device (not shown) through the piston rod 50 and the operating arm 52.

Figure 2:
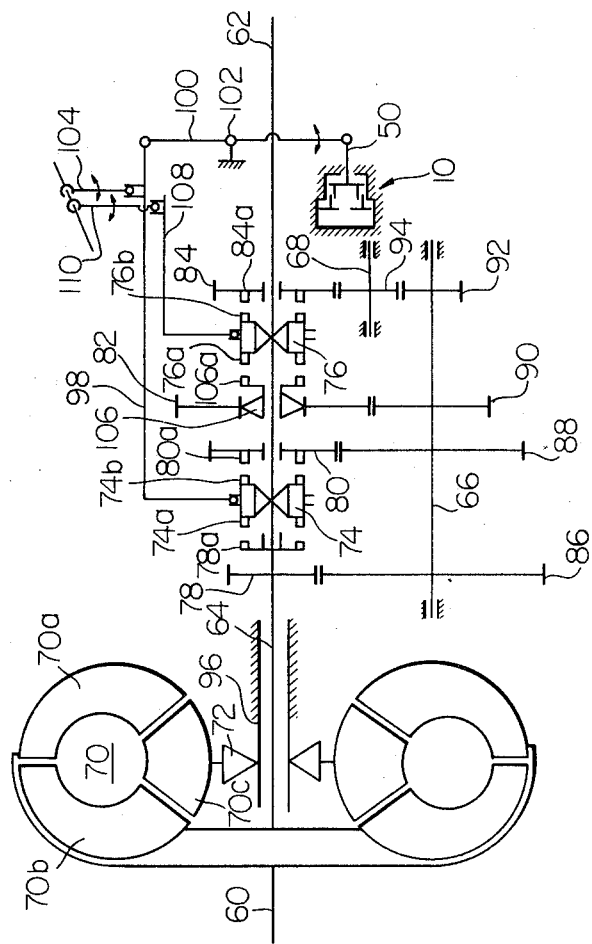
FIG. 2 is a schematic view of an example of the application of the device of FIG. 1 to an automotive automatic transmission.

FIG. 2 illustrates an example of the practical application of the device 10 shown in FIG. 1. As shown, the device 10 is incorporated in an automotive automatic power transmission of a usual type. The power transmission is shown to comprise a drive shaft 60 and a driven or main shaft 62. The drive shaft 60 is driven by a suitable prime mover, and the main shaft 62 is connected to driving wheels (not shown) of the vehicle. The transmission also comprises a turbine shaft 64, and counter shafts 66 and 68. The turbine shaft 64 is positioned in line with the shaft 60 and 62 while the counter shaft 66 and 68 are positioned in spaced relation with the shafts 60 and 62. The transmission also comprises a hydraulic torque converter 70 with a one-way brake 72, first and second dog clutches 74 and 76 and a plurality of gears 78, 80, 82, 84, 86, 88, 90, 92 and 94.

The hydraulic torque converter 70 comprises, as customary, a pump 70a, a turbine 70b, and a stator 70c.

The torque converter 70 operates in a manner well known for driving the turbine 70b.

The first dog clutch 74 includes clutch teeth 74a and 74b, and is splined to a hab(not shown) fixed to the shaft 62. The dog clutch 74 is connected to a shift rod 98 which in turn is connected to a shift lever 100 pivotted at 102. The shift lever 100 is connected to the piston rod 50 of the device 10 of this invention so as to move the dog clutch 74 into engagement with either the teeth 78a or the teeth 80a. The shift rod 98 is operatively connected to a shift arm 104 which is adapted to be controlled manually. The gear 80, which has the clutch teeth 80a, is rotatably mounted on the shaft 62. The gear 82 is fixed on a one-way clutch 106 rotatable with the shaft 62. The one-way clutch 106 is provided with clutch teeth 106a which selectively engage with the second dog clutch 76.

The second dog clutch 76 includes clutch teeth 76a and 76b and is adapted to be moved into engagement with either the teeth 106a or the teeth 84a by controlling a shift rod 108 operatively connected to a shift arm 110. The gear 84, which has the clutch teeth 84a, is rotatably disposed on the shaft 62.

The gears 86, 88, 90 and 92 are fixed on the counter shaft 66, and are in mesh with the gears 78, 80, 82 and 94, respectively. The gear 94, which is fixed on the shaft 68, is provided between the gears 84 and 92.

When, in operation, the piston rod 50 of the device 10 is moved to its intermediate position (see FIG. 1), the dog clutch 74 is moved to a neutral position as shown in FIG. 2. If, in this instance, the dog clutch 76 is moved, under the control of the shift arm 110, to a position in which the teeth 76a of the dog clutch 76 engages with the teeth 106a connected to the one-way clutch 106, a low speed power train is established. The turbine torque built up by the torque converter 70 is then distributed through the shaft 64, gears 78 and 86, counter shaft 66, gears 90 and 82, one-way clutch 106 and dog clutch 76 to the main shaft 62, whereby a reduced gear ratio for the first forward drive is built up.

As the vehicle speed increases, the engine is decelerated. The one-way clutch 106 then starts free-wheeling, thereby decreasing the rotational speed of the gear 82. The rotational speed of the gear 80 also decreases as the engine is decelerated, whereby the rotational speed of the dog clutch cynchronize with the rotational speed of the gear 80.

If, in this instance, the fluid pressure is drawn only into the bore 16 through the port 20 (see FIG. 1), the piston 26 is moved to its innermost position so that the piston rod 50 is moved in the same direction as the piston 26. This causes the shift lever 100 to rotate clockwise, thereby moving the dog clutch 74 to a position in which the teeth 74b engages with the teeth 80a. The power delivered from the turbine shaft 64 is then transmitted through the gears 78 and 86, counter shaft 66, gears 88 and 80, and dog clutch 74 to the main shaft 62. An intermediate speed drive ratio is thus established.

As the vehicle speed further increases, the engine is also decelerated in a manner discussed above. During this deceleration of the engine, the fluid pressure is also drawn into the bore 14 through the port 18 (see FIG. 1), so that the piston 26 is moved to its intermediate position. Consequently, the dog clutch 74 is set to the neutral position. When the engine speed is decreased so as to synchronize the rotational speed of the gear 78 with that of the main shaft 62, the fluid pressure obtaining in the bore 16 is discharged therefrom, whereby the piston 26 is moved to its outermost position. This causes the shift lever 100 to rotate counterclockwise, thereby moving the dog clutch 74 to a position in which the teeth 74a engages with the teeth 78a. The power delivered from the turbine shaft 64 is then transmitted through the dog clutch 74 to the main shaft 62, and thus a high speed drive ratio is established.

It will be apparent that the power transmission described above can be controlled manually by discharging the fluid pressure from both of the bores 14 and 16 thereby to cause the shift arm 104 to freely move to an desired position.

The application of the device according to this invention as illustrated in FIG. 2 is for illustrative purposes alone and the device disclosed herein may find various practical applications in numerous quarters of the industry.

What is claimed is

1. A device for selecting three different positions, comprising a hollow body of contoured internal section and having formed therein first and second bores selectively communicating with a source of pressurized fluid, said first bore being larger in cross section than said second bore, a first piston having a flange slidably fitted in said first bore and a hollow extension extending from said flange and slidably fitted in said second bore, a first piston ring provided between the outer peripheral edge of the flange of said first piston and the inner wall of said first bore, a second piston having a flange slidably fitted in said second bore and a hollow extension extending from said flange of said second piston and slidably fitted in the inner peripheral wall of said extension of said first piston, a second piston ring provided between the outer peripheral edge of the flange of said second piston and the inner wall of said second bore, a third piston ring mounted between said hollow extensions of said first and second pistons, said flange of said first piston having an aperture formed therein to provide communication between said first bore and the interior of said hollow extension of said second piston to cause the pressurized fluid admitted to said first bore to act on the inner wall surface of the flange of said second piston, a drain port communicating with a clearance between said hollow extensions of said first and second pistons to ensure smooth movement of said second piston relative to said first piston, and a piston rod rigidly connected to said flange of said second piston and extending through said second bore outwardly from said hollow body, said second piston being held in an intermediate position when both of said first and second bores communicate with said source of the pressurized fluid to cause both of the flanges of said first and second pistons to be subjected to a fluid pressure, said second piston being moved to an innermost position when the communication between said first bore and said source of the pressurized fluid is blocked to cause only the flange of of said second piston to be subjected to the fluid pressure and to an outermost position when the communication between said second bore and said source of the pressurized fluid is blocked to cause only the flange of said second piston to be subjected on its inner surface to the fluid pressure drawn from said first bore through said aperture, whereby said piston rod is moved to three different positions corresponding to said innermost, intermediate and outermost positions, of said second piston.

* * * * *